US010108599B2

(12) United States Patent
Vardi et al.

(10) Patent No.: US 10,108,599 B2
(45) Date of Patent: Oct. 23, 2018

(54) LANGUAGE PLATFORM

(71) Applicant: eBay Inc., San Jose, CA (US)

(72) Inventors: Yoram Vardi, Sunnyvale, CA (US); Kumar Nagarur Kiran, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/298,770

(22) Filed: Jun. 6, 2014

(65) Prior Publication Data
US 2015/0356071 A1 Dec. 10, 2015

(51) Int. Cl.
*G06F 17/27* (2006.01)
*G06F 17/28* (2006.01)
*G06Q 10/06* (2012.01)

(52) U.S. Cl.
CPC ............ *G06F 17/27* (2013.01); *G06F 17/289* (2013.01); *G06F 17/2854* (2013.01); *G06F 17/2872* (2013.01); *G06Q 10/06* (2013.01)

(58) Field of Classification Search
CPC .... G06F 17/289; G06F 17/27; G06F 17/2854; G06F 17/2872; G06Q 10/06
USPC .......................................................... 704/2
See application file for complete search history.

(56) References Cited

U.S. PATENT DOCUMENTS

| | | | |
|---|---|---|---|
| 8,145,472 B2 * | 3/2012 | Shore | G06F 17/2836 704/2 |
| 8,401,839 B2 | 3/2013 | Kim | |
| 2009/0313006 A1 | 12/2009 | Tang | |
| 2010/0076746 A1 * | 3/2010 | Aikawa | G06F 17/2775 704/3 |
| 2011/0225104 A1 * | 9/2011 | Soricut | G06F 17/289 705/348 |
| 2011/0282647 A1 | 11/2011 | Pastore | |

(Continued)

FOREIGN PATENT DOCUMENTS

| | | |
|---|---|---|
| EP | 1368749 A1 | 12/2003 |
| WO | WO-2015188137 A1 | 12/2015 |

OTHER PUBLICATIONS

"International Application Serial No. PCT/US2015/034544, International Search Report dated Sep. 14, 2015", 2 pgs.

(Continued)

*Primary Examiner* — Bharatkumar S Shah
(74) *Attorney, Agent, or Firm* — Schwegman Lundberg & Woessner, P.A.

(57) ABSTRACT

A system receives original content from a user for translating to translated content. If a machine is to be used for translating, the system determines whether the machine-translated content is to be used as the translated content, or whether the machine-translated content should be transmitted to human translators for scoring or review. If the machine-translated content is not to be used as the translated content, it is sent to human translators for scoring or review. If the machine-translated content is to be used as the translated content, the machine-translated content may still be transmitted to human translators for scoring or review, the results used for machine learning. If a machine is not to be used for translating, the original content is sent to human translators for translating. The foregoing determinations are made based on user information or on statistical analysis.

18 Claims, 7 Drawing Sheets

(56) References Cited

U.S. PATENT DOCUMENTS

| | | | |
|---|---|---|---|
| 2012/0221319 A1* | 8/2012 | Trese | G06F 17/28 |
| | | | 704/2 |
| 2013/0090915 A1 | 4/2013 | Clark | |
| 2013/0289973 A1* | 10/2013 | Xiao | G06F 17/2223 |
| | | | 704/3 |
| 2014/0142917 A1* | 5/2014 | D'Penha | G06F 17/2836 |
| | | | 704/2 |
| 2015/0051897 A1* | 2/2015 | Waibel | G06F 17/275 |
| | | | 704/2 |
| 2015/0120273 A1* | 4/2015 | Gusakov | G06F 17/289 |
| | | | 704/2 |

OTHER PUBLICATIONS

"International Application Serial No. PCT/US2015/034544, Written Opinion dated Sep. 14, 2015", 4 pgs.

\* cited by examiner

LANGUAGE PLATFORM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

TECHNICAL FIELD

The present application relates generally to publication systems and, in one specific example, to techniques for machine translation for ecommerce transactions.

BACKGROUND

The use of mobile devices, such as cell phones, smartphones, tablets, and laptop computers, has increased rapidly in recent years, which, along with the rise in dominance of the Internet as the primary mechanism for communication, has caused an explosion in activity in publication systems including, among others, electronic commerce ("ecommerce") systems.

BRIEF DESCRIPTION OF THE DRAWINGS

Some embodiments are illustrated by way of example and not limitation in the figures of the accompanying drawings in which.

DETAILED DESCRIPTION

Communications between users that utilize different spoken or written languages increase exponentially with the development of information technology. There are challenges when dealing with differing languages on publication systems because transactions on publication systems, and especially transactions on ecommerce systems, often require specific information to be highly accurate. For example, if a potential buyer asks a seller about some aspect of a product for sale, the answer should be precise and accurate. Any failing in the accuracy of the answer could result in a lost sale or an unhappy purchaser. Hence, for ecommerce, as one example, accuracy in translating queries from one language to another is critical.

Example methods and systems for managing translation management systems (TMS) and machine translation (MT), or some combination of both, are provided. TMS, as used in this application, may be interpreted to mean an engine that manages human translation by linguists. The TMS engine may be a commercially available system such as WORLD-SERVER™ but might also be considered to include various tools that people can interact with for reviewing and generating translations. It will be evident, however, to one of ordinary skill in the art that the present inventive subject matter may be practiced without these specific details.

According to various exemplary embodiments, MT for publication systems and, especially, for ecommerce comprises translating a query in a first language to a query in a second language and querying an ecommerce database that is maintained in the second language to obtain a result set of items in the second language that is responsive and faithful to the query in the first language. Relevancy of the result set of items to the user of the first language is measured and is used to optimize translation of queries in the first language to queries in the second language. While query content translation is important, the following disclosure also relates to machine translation of original content of all types and of varying sizes.

MT may include calculating a confidence score for each word/phrase in a machine translation of original content which may be received by a receiver module, and then looking at the average frequency of certain words/phrases in the original content in relation to each other to determine general probabilities, (sometimes called a probability score) that certain words or phrases would likely follow other words or phrases. The confidence score may then be applied to the probability, or statistical, score to derive a combined score that could be used to determine whether to allow the machine translation to be used or to pass the text (or a portion of the text) to a human translator. The combined score could also be weighted based on the importance of the term (e.g., terms in the title may be more important than in the larger written description, measurements may be more important than general text, etc.). There may also be a feedback mechanism where the user may be prompted to clarify certain terms if the confidence scores are too low. The foregoing scoring allows a certain confidence to be placed on the translated content. This confidence may be used in automatically determining whether to use the translated content that results from MT alone, or whether to combine MT with human translation by, for example, linguists or, in some cases, to use human translation alone. As illustrated above, confidence is based on statistical analysis. Whether to combine MT and human translation to obtain translated content may also be indicated by instructions from a user who provides the original content.

Figure 1:
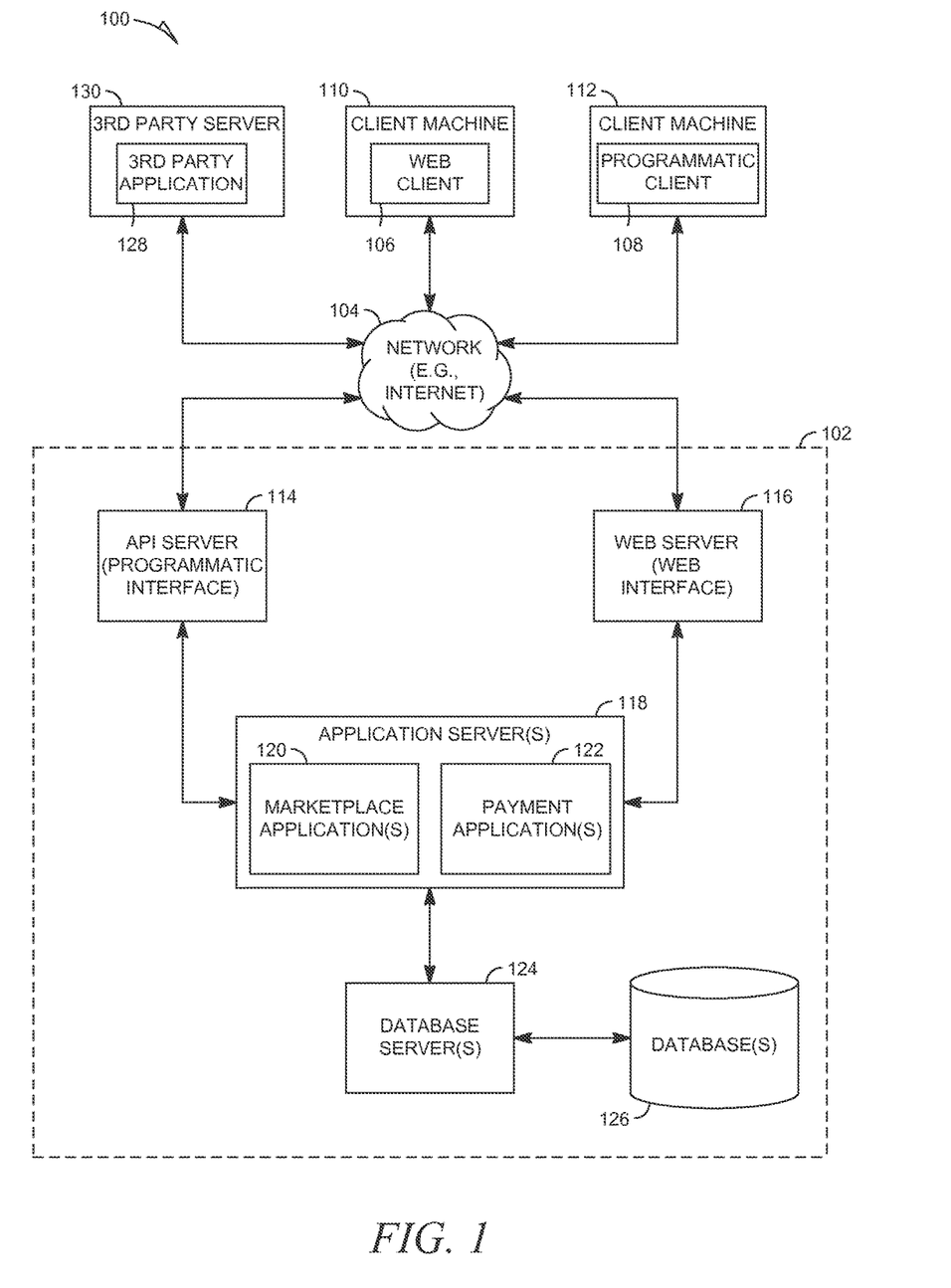
FIG. 1 is a network diagram depicting a client-server publication system, within which one example embodiment may be deployed.

FIG. 1 is a network diagram depicting a client-server publication system 100, within which one example embodiment may be deployed. A networked system 102, in the example forms of a network-based marketplace or publication system, provides server-side functionality, via a network 104 (e.g., the Internet or a Wide Area Network (WAN)), to one or more clients, FIG. 1 illustrates, for example, a web client 106 (e.g., a browser, such as the Internet Explorer browser developed by Microsoft Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
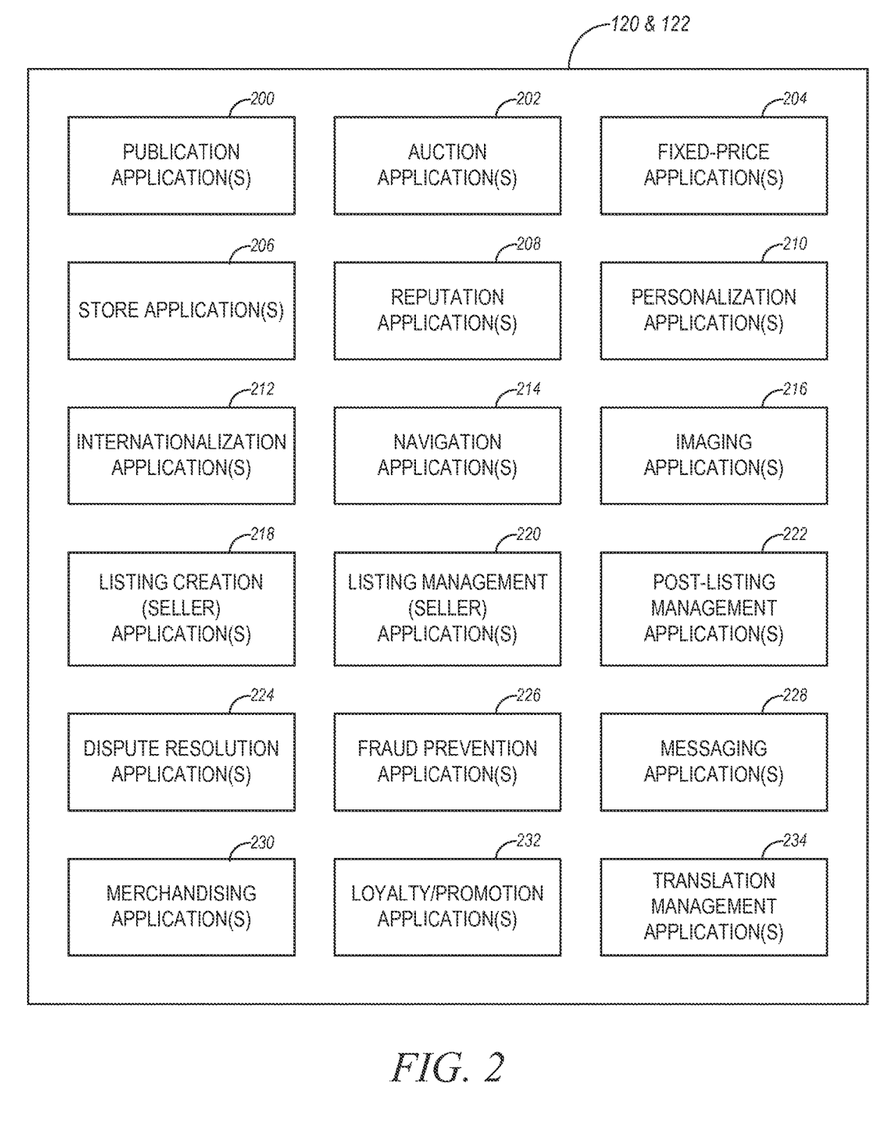
FIG. 2 is a block diagram illustrating marketplace and payment applications and that, in one example embodiment, are provided as part of application server(s) in the networked system.

FIG. 2 is a block diagram illustrating marketplace and payment applications 120 and 122 that, in one example embodiment, are provided as part of application server(s) 118 in the networked system 102, The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.), The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions, A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

TMS application(s) 234 may manage translation of original content to translated content based on information provided by the user or by a determination made by the machine itself, to translate an original content in a first language to translated content in a second language. A more detailed view of TMS accordance with an embodiment is seen in FIG. 3.

Figure 3:
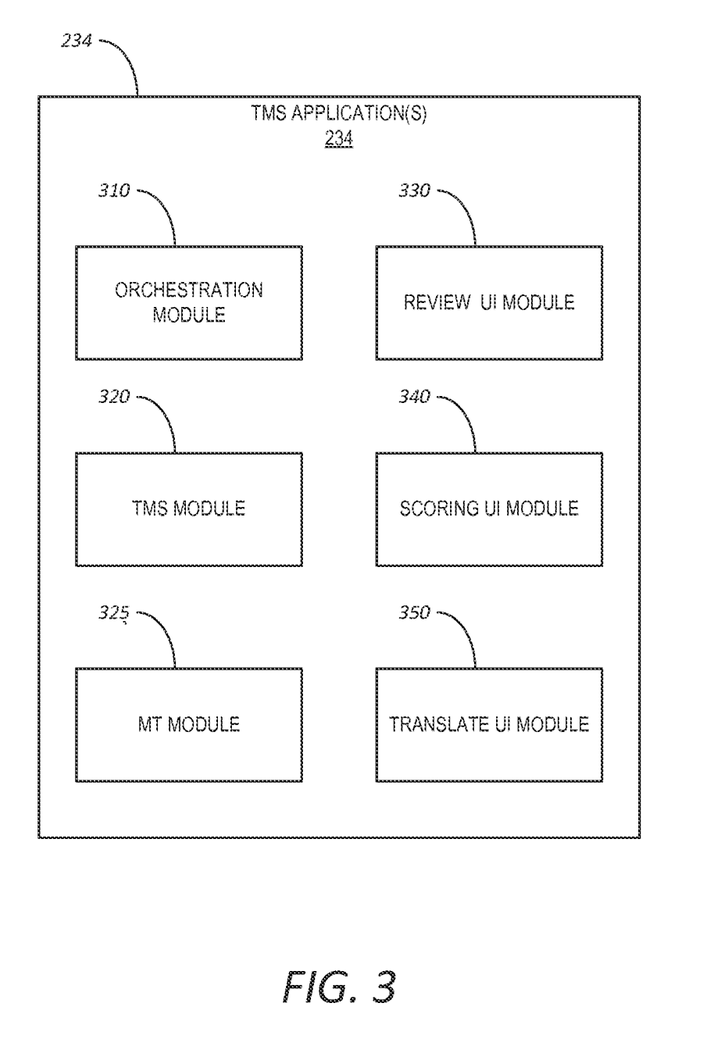
FIG. 3 is a block diagram illustrating an example translation management system (TMS) application according to an example embodiment.

FIG. 3 is a block diagram illustrating an example TMS engine, or TMS application(s) 234 according to an example embodiment. TMS application(s) 234 comprises an orchestration module 310 (which may comprise the orchestration layer 610 of FIG. 6), a TMS module 320, such as commercially available Worldserver, for automating many parts of the human language translation process and maximizing translator efficiency, by automating repeatable and non-essential work that can be done by software/systems and leaving the creative work of translation and review to be done by human beings. Translation may also be accomplished by MT module 325. TMS application(s) 234 may also include a Review UI module 330 for providing a review UI to human translators, a Scoring UI module 340 for providing a scoring UI to human translators, and a translate UI module 350 for providing a translate UI to human translators, as discussed in more detail below. Additional types of UI modules for providing such additional types of UIs may also be included.

Language Platform

Figure 4:
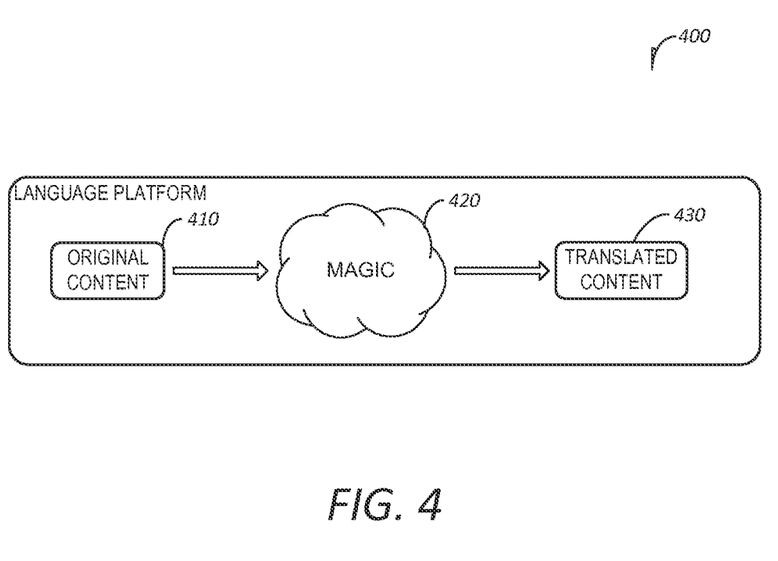
FIG. 4 is a block diagram illustrating a language platform according to an example embodiment.
Figure 6:
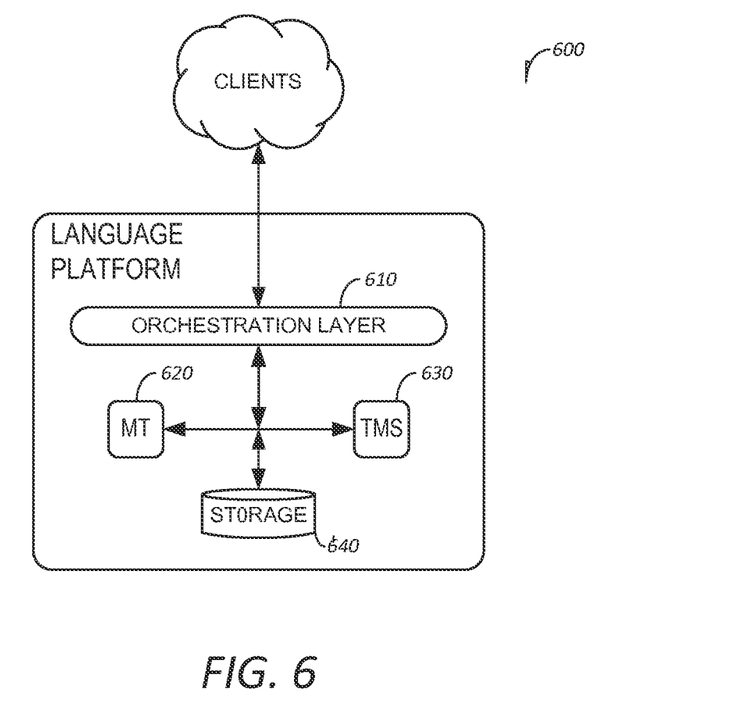
FIG. 6 is a diagram of components that comprise the language platform, according to an example embodiment.

The language platform may have two major services for translations: Human and MT. Each of those services has a different role but may be combined to achieve a powerful impact. FIG. 4 is a block diagram illustrating a very high level view of a language platform according to an example embodiment. A more detailed view of a language platform is seen in FIG. 6. With continued reference to FIG. 4, the language platform 400 may be a platform that combines localization and MT to present a unified "magic" solution 420 to users who provide original content 410 and desire translated content 430.

Figure 5:
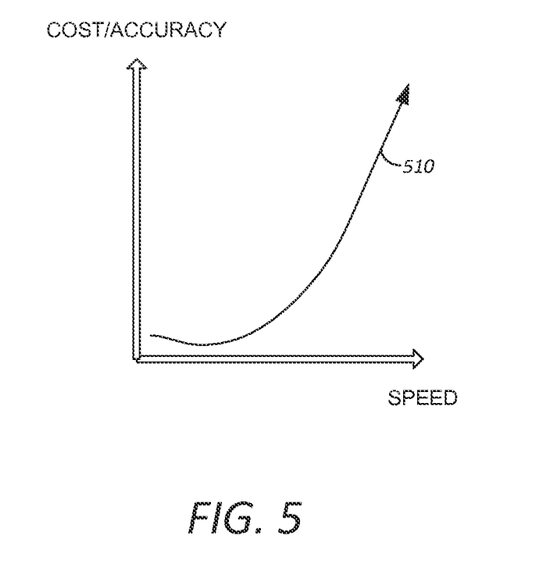
FIG. 5 is a graph illustrating cost and/or accuracy of translation versus speed of translation that may affect how a translation may be performed, according to an example embodiment.

The internal operation of this language platform within a publication system may provide a choice to users. Users may be able to select their Service Level Agreement (SLA) for the translated content (whether the user desires a quality based SLA or a speed based SLA) and the platform should be able to decide how to route the user's original content for translation accordingly. This choice is seen graphically in FIG. 5. FIG. 5 is a graph 510 illustrating cost and/or accuracy of translation versus speed of translation that may affect how a translation may be performed, according to an example embodiment. The graph of FIG. 5 may form the basis of a user interface by which a user may select a desired position, such as a trade-off between cost and/or accuracy of translation and the speed of making the translation, and present that information to the system. Based on the user's choice the system may determine which components of the language platform (MT. TMS, or both) to use to achieve the translated content in accordance with user choice. Some of these may be:

1. MT only (if fast response is required and quality does not matter as much).
2. MT with some verification provided by TMS (either by human scoring, or MT can score itself).
3. TMS only, using human translation, such as by linguists, where quality is important and time to market is long enough.

There are at least two interaction models that may be used to achieve the translated content in accordance with user choice. The first and simplest one is having the localization platform use MT in order to provide translation suggestion. This way, when a human translator starts working he or she will have some suggestions, normally provided by MT, that the translator can start working with. As such, an appropriate interface may be provided to the localization TMS engine and add MT to localization workflow.

The second interaction model is an orchestration layer, such as layer 610 of FIG. 6, discussed below, which, as original content comes in from a user, makes a decision on how to translate it. At that point, the original content can either:

1. Go to MT and return translated content immediately to the user.
2. Go to MT and continue to have some human translation interaction.
3. Go to TMS and involve human translation from the beginning.

The client may have the option of more than one API call for providing original content to the system, and for checking on the status of the translation. These may be:

1. "Quick" synchronous translations APIs where the translated content is needed almost immediately and MT only be used.
2. Asynchronous APIs such as:
   a. Original content is delivered along with the API call,
   b. Original content is offloaded and delivered, or retrieved in a different process,
   c. Callback is registered and called as soon as the translation is done,
   d. Requester polls and checks for the original content status.

FIG. 6 is a diagram of the main components that comprise the language platform, according to an example embodiment for high level illustration purposes. Language Platform 600 comprises orchestration layer 610 which determines what is the workflow for each original content within the language platform. Orchestration layer 610 is coupled to the MT component 620 and to the TMS engine 630 (also seen in greater detail as TMS Application(s) 234 in FIG. 3). Each is coupled to storage 640. The orchestration layer 610 is the language platform component that will determine which of the TMS engine components, if any, to use to achieve the translated content in accordance with the user's choice or, in some examples, the system's determination based on system confidence. The TMS engine may be a commercially available system such as Worldserver but might also be considered to include various tools that people can interact with for reviewing and generating translations. The orchestration layer 610 may also be illustrated as being part of the TMS application(s) 234 of FIG. 3.

Figure 7:
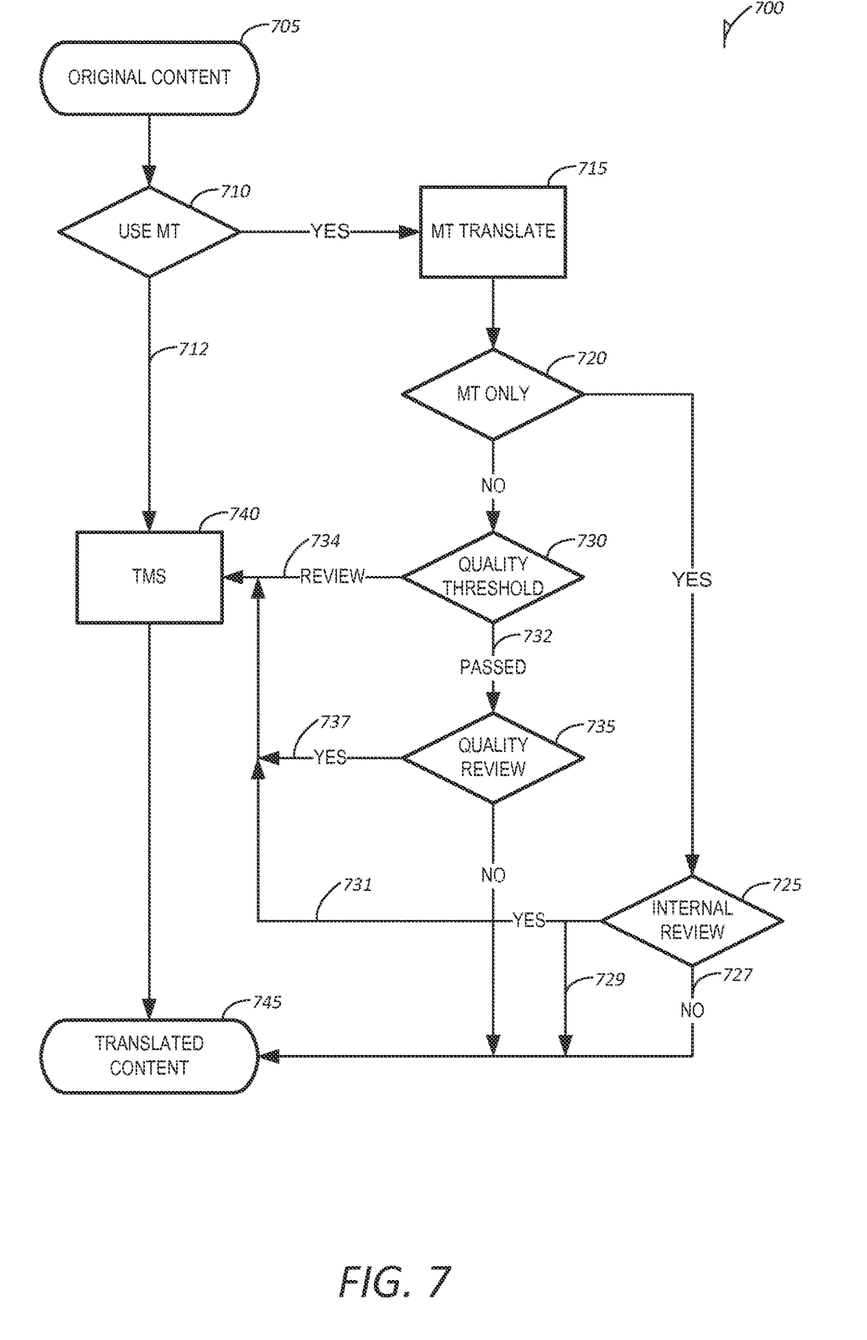
FIG. 7 is a flowchart illustrating an example method consistent with various embodiments.

FIG. 7 is a flowchart illustrating an example method 700 consistent with various embodiments and may illustrate the operation of the orchestration module 310 of FIG. 3. In one embodiment, essentially all decisions shown in the flowchart of FIG. 7 will be made by the orchestration module 310. The rest of the components of FIG. 3, including MT module 325 and TMS module 320 (including related tools)) will be focused on doing what these components normally do such as making translations, and the like.

Continuing with respect to FIG. 7, original content enters the operation at 705. Orchestration module 310 of FIG. 3 makes a determination at 710 whether to use MT or TMS. The determination may be made based on the choices provided by the user as discussed with respect to FIG. 5. Alternatively, the system itself may decide whether or not the translation is to be by MT. For example, the system may decide by quality scoring the original content whether or not MT can translate the original content well. If MT is not to be used, the "NO" leg will be taken from decision 710 and the original content will be sent to TMS for translation as illustrated by line 712, for TMS operation to be discussed subsequently. If the decision is to use MT then translation is made by MT, as at 715. The decision is then made at 720 whether to use MT only. If the need for translation is not immediate, or if the instructions from the user indicate that additional quality may be needed, the "NO" leg is taken. The system may then determine, at 730, whether a quality threshold is met. This quality threshold may be set by the system, or may be set from information provided by the user, discussed above.

If the quality threshold is not successfully passed at 730, the translation from MT will be passed to the TMS application, as indicated by box 740, as illustrated at line 734, for TMS operation, to be discussed subsequently. If the quality threshold is met, or passed, as indicated at 732, the translation may still undergo a quality review. The quality review decision is made at decision block 735 and may be based on a statistical decision by the system that confidence in the MT translation is not high, despite the fact that the quality threshold 730 has been passed. The statistical reason for this might be just to have human verification, notwithstanding a high confidence in the MT translation, in other words to confirm the MT-provided score. If the decision is to proceed with a quality review, as illustrated by line 737, the translated content may be sent to TMS for review or scoring, as discussed in greater detail below.

If the "YES" leg is taken from 720, the MT-only translation will be used as the translated content without additional revisions as a result of TMS. This might occur, in one embodiment, as discussed above, when the translation is needed nearly immediately and there is no time to involve the TMS engine. If the "YES" leg is taken, then the MT-only translation will be provided as the translated content at 745. Even though the MT-only translated content is to be used as the translated content at 745, internal review may still be desired because of low confidence in the MT-only translation, based on statistical analysis as discussed above. As discussed above, the statistical reason for this might be just to have human verification even there is a high confidence in the MT translation, in other words to confirm the MT-provided score. Consequently, the decision block at 725 tests whether the MT-only translation is to undergo internal review. If the "YES" leg is taken from decision block 725, the MT-only translated content is then transmitted as translated content at 745 via line 729, and is also transmitted to the TMS engine at 740. When transmitted to the TMS engine, the TMS engine may request the human translator to score or review the translation quality. Alternatively, the TMS engine may ask the human translator for a suggested translation instead of the MT-only translation. In either case, the results may be fed back to the system for machine translation learning, so that next time when the same original content is encountered a better translation would be provided by MT. If the "NO" leg is taken from decision block 725, the MT-only translation is provided directly as the translated content at 745 as illustrate by line 727.

When the translated content is sent to the TMS application 740, as indicated by lines 712, 734, 737, or 731, TMS may engage human translators to augment the MT translation of the original content in some way or, in one embodiment, to perform the entire translation instead of having the translation performed by MT. In one embodiment, the MT translation of the original content may be provided to human translator via, or in association with, a review UI presented to a human translator by review UI module 330 of FIG. 3. In another embodiment, the MT translation of the original content may be presented to a human translator via, or in association with, a scoring UI presented to the human translator by scoring UI module 340 of FIG. 3. In yet another embodiment, the original content itself may be presented to human translators for translation instead of relying on MT for the translation as indicated by line 712 in FIG. 7, In this case the original content may be provided to a human translator via, or in association with, a translate UI presented to the human translator by translate UI module 350 of FIG. 3.

When the MT translation is sent via a review UI, TMS may provide information to the human translator requesting that the human translator review the quality of the translation and provide feedback. In one embodiment, the system may provide an indication of issues in the MT translation so that the human translator does not have to review the entire MT translation. The feedback from the human translator may indicate either the score for the translation or he/she might provide a better translation that should be used. The TMS may then use this feedback to have the MT translation revised or corrected before providing it as the translated content.

When the original content is sent via a translate UI as illustrated by line 712 of FIG. 7, the TMS may request that the human translator translate the original content. That translation may then be used as the translated content. When the MT translation is sent to a human translator via a scoring UI, TMS may provide information to the human translator requesting that the human translator score the MT translation according to a scoring rule. Based on the result of the score, for example, whether or not the score exceeds a particular criterion, the TMS may use this feedback to have the MT translation revised before providing it as the translated content. In one embodiment, if the human translator score is low and the system previously scored the MT translation as high, the system would know there is an issue. That issue may be resolved by re-sending the MT translation to the human translator via the review UI to have the human review and revise the MT translation.

Modules, Components and Logic

Certain embodiments are described herein as including logic or a number of components, modules, or mechanisms. Modules may constitute either software modules (e.g., code embodied (1) on machine-readable storage or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 802 (discussed in additional detail with respect to FIG. 8, below) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure processor 802, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processor 802 or processors 802 may be located in a single location (e.g., within a home environment, an office environment or as a server farm), while in other embodiments the processors 802 may be distributed across a number of locations.

The one or more processors 802 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 802, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 802 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 802), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
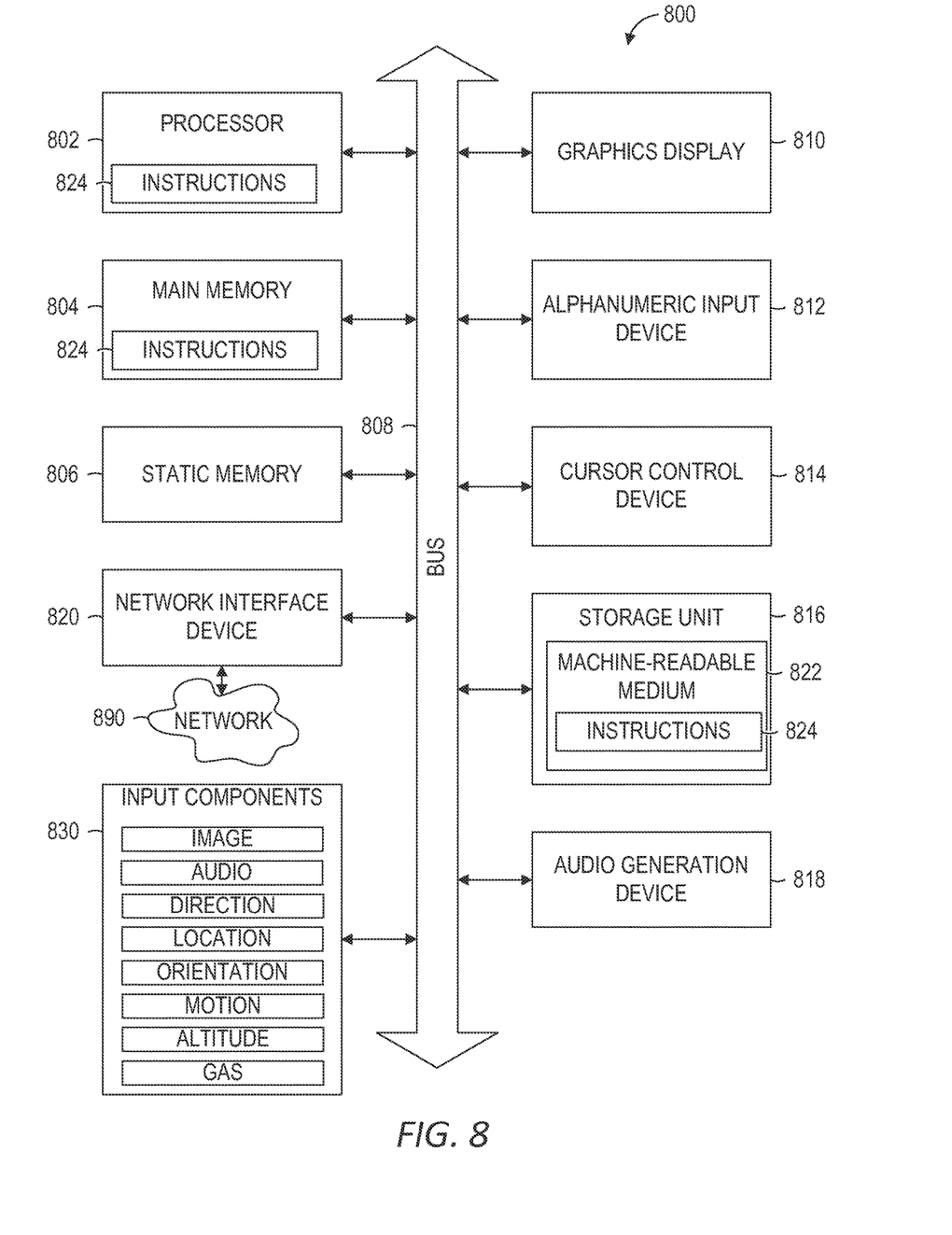
FIG. 8 is a block diagram of a machine in the example form of a computer system within which instructions may be executed for causing the machine to perform any one or more of the methodologies discussed herein.

FIG. 8 is a block diagram of machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (e.g., cursor control) device 814 (e.g., a mouse), a disk drive unit 816, a signal generation device 818 (e.g., a speaker) and a network interface device 820.

Machine-Readable Medium

The disk drive unit 816 includes a computer-readable medium 822, which may be hardware storage, on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting computer-readable media 822.

While the computer-readable medium 822 is shown in an example embodiment to be a single medium, the term "computer-readable medium" may include a single medium or multiple media (e.g., a centralized or distributed database, and/or associated caches and servers) that store the one or more instructions 824 or data structures. The term "computer-readable medium" shall also be taken to include any tangible medium that is capable of storing, encoding or carrying instructions 824 for execution by the machine and that cause the machine to perform any one or more of the methodologies of the present disclosure or that is capable of storing, encoding or carrying data structures utilized by or associated with such instructions 824. The term "computer-readable medium" shall accordingly be taken to include, but not be limited to, solid-state memories, and optical and magnetic media. Specific examples of computer-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 724 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computer-implemented method comprising: receiving original content associated with a first language from a first client machine;
   translating, using one or more processors of a computing system, the original content to machine-translated content associated with a second language;
   determining individual confidence scores for a plurality of expressions of the machine-translated content, each expression comprising at least one of a word or a phrase;
   determining individual probability scores for the plurality of expressions;
   determining individual combined scores for the plurality of expressions from the individual confidence scores and the individual probability scores;
   determining, based on the individual combined scores for the plurality of expressions, that a part of the machine-translated content fails to satisfy a quality threshold;
   transmitting a part of the original content corresponding to—the part of the machine-translated content failing to satisfy the quality threshold to a second client machine;
   and receiving a translation of at least the part of the original content from the second client machine.

2. The computer-implemented method of claim 1, further including receiving a score of the part of the original content corresponding to the machine-translated content failing to satisfy the quality threshold from a human translator.

3. The computer-implemented method of claim 1, wherein the translation is received from a human translator associated with the second client machine.

4. The computer-implemented method of claim 1 further including:
   receiving second original content associated with the first language; translating the second original content to second machine-translated content associated with the second language; determining that the second machine-translated content satisfies the quality threshold; and publishing the second machine-translated content without further translation by any human translator.

5. The computer-implemented method of claim 1, further including: receiving second original content associated with the first language; translating the second original content to second machine-translated content;
   determining that the second machine-translated content fails to satisfy the quality threshold;
   transmitting the second original content to a third client machine associated with a human translator; and
   receiving a second translation of an entirety of the second machine-translated content from the third client machine.

6. One or more non-transitory computer-readable hardware storage devices having embedded therein a set of instructions which, when executed by one or more processors of a computer, cause the one or more processors to execute operations comprising:
   receiving original content associated with a first language from a first client machine;
   translating the original content to machine-translated content associated with a second language;

determining individual confidence scores for a plurality of expressions of the machine-translated content, each expression comprising at least one of a word or a phrase;

determining individual probability scores for the plurality of expressions; determining individual combined scores for the plurality of expressions from the individual confidence scores and the individual probability scores;

determining, based on the individual combined scores for the plurality of expressions, that a part of the machine-translated content fans to satisfy a quality threshold;

transmitting a part of the original content corresponding to the part of the machine-translated content failing to satisfy the quality threshold to a second client machine; and receiving a translation of at least the part of the original content from the second client machine.

7. The one or more non-transitory computer-readable hardware storage devices of claim 6, the operations further comprising receiving a score of the part of the original content corresponding to the machine-translated content failing to satisfy the quality threshold from a human translator.

8. The one or more non-transitory computer-readable hardware storage devices of claim 6, wherein the translation is received from a human translator associated with the second client machine.

9. The one or more non-transitory computer-readable hardware storage devices of claim 6, the operations further comprising: receiving second original content associated with the first language; translating the second original content to second machine-translated content associated with the second language;
determining that the second machine-translated content satisfies the quality threshold; and
publishing the second machine-translated content without further translation by any human translator.

10. The one or more non-transitory computer-readable hardware storage devices of claim 6, the operations further comprising: receiving second original content; translating the second original content to second machine-translated content; determining that the second machine-translated content fails to satisfy the quality threshold;
transmitting the second original content to a third client machine associated with a human translator, and receiving a second translation of an entirety of the second original content from the third client machine.

11. A system including: at least one processor; and memory including instructions which, when executed by the at least one processor, cause the at least one processor to:
receive original content associated with a first language from a first client machine;
translate the original content to machine-translated content associated with a second language;
determine individual confidence scores for a plurality of expressions of the machine-translated content, each expression comprising at least one of a word or a phrase;
determine individual probability scores for the plurality of expressions; determine individual combined scores for the plurality of expressions from the individual confidence scores and the individual probability scores;
determine, based on the individual combined scores for the plurality of expressions, a part of the machine-translated content fails to satisfy a quality threshold;
transmit a part of the original content corresponding to the part of the machine-translated content failing to satisfy the quality threshold to a second client machine;
and receive a translation of at least the part of the original content from the second client machine.

12. The system of claim 11, wherein the instructions when executed further cause the at least one processor to receive a score of the part of the original content corresponding to the machine-translated content failing to satisfy the quality threshold from a human translator.

13. The system of claim 11, wherein the translation is received from a human translator associated with the second client machine.

14. The system of claim 11, wherein the instructions when executed further cause the at least one processor to: receive second original content associated with the first language; translate the second original content to second machine-translated content associated with the second language;
determine that the second machine-translated content fans to satisfy the quality threshold;
transmit the second original content a third client machine associated with a human translator; and receive a second translation of an entirety of the second original content from the third client machine.

15. The computer-implemented method of claim 1, further including weighting the individual combined scores based on a position of an expression within the original content or a data type of an expression.

16. The one or more non-transitory computer-readable hardware storage devices of claim 6, the operations further comprising weighting the individual combined scores based on a position of an expression within the original content or a data type of an expression.

17. The system of claim 11, wherein the instructions when executed further cause the at least one processor to: receive second original content associated with the first language; translate the second original content to second machine-translated content associated with the second language; determine that the second machine-translated content satisfies the quality threshold; and publish the second machine-translate content without further translation by any human translator.

18. The system of claim 11, wherein the instructions when executed further cause the at least one processor to: receiving second original content associated with the first language; translating the second original content to second machine-translated content associated with the second language; determining that the second machine-translated content satisfies the quality threshold; and publishing the second machine-translated content without further translation by any human translator.

* * * * *

UNITED STATES PATENT AND TRADEMARK OFFICE
CERTIFICATE OF CORRECTION

PATENT NO. : 10,108,599 B2
APPLICATION NO. : 14/298770
DATED : October 23, 2018
INVENTOR(S) : Yoram Vardi et al.

Page 1 of 1

It is certified that error appears in the above-identified patent and that said Letters Patent is hereby corrected as shown below:

In the Claims

In Column 14, Line 28, in Claim 1, delete "to—the" and insert -- to the --, therefor.

In Column 15, Line 12, in Claim 6, delete "fans" and insert -- fails --, therefor.

In Column 15, Line 46, in Claim 10, delete "translator," and insert -- translator; --, therefor.

In Column 16, Line 6, in Claim 11, after "expressions," insert -- that --.

In Column 16, Line 26, in Claim 14, delete "fans" and insert -- fails --, therefor.

In Column 16, Line 48, in Claim 17, delete "translate" and insert -- translated --, therefor.

Signed and Sealed this
Nineteenth Day of January, 2021

Andrei Iancu
*Director of the United States Patent and Trademark Office*